COURTLAND H. BARR, INVENTOR.

BY Lyon & Lyon
ATTORNEYS

Sept. 30, 1952 C. H. BARR 2,612,160
INTRAVENOUS SOLUTION DISPENSING APPARATUS
Filed Aug. 11, 1949 2 SHEETS—SHEET 2

COURTLAND H. BARR,
INVENTOR.

BY *Lyon & Lyon*
ATTORNEYS

Patented Sept. 30, 1952

2,612,160

UNITED STATES PATENT OFFICE 2,612,160

INTRAVENOUS SOLUTION DISPENSING APPARATUS

Courtland H. Barr, Los Angeles, Calif.

Application August 11, 1949, Serial No. 109,652

8 Claims. (Cl. 128—214)

My invention relates to dispensing intravenous solutions and particularly to apparatus useful in such dispensing.

Standard and well known procedure for the dispensing of intravenous solutions such as restored dried plasma, liquid plasma, glucose solutions, normal saline solutions, dextrose solutions, whole blood and the like requires a container carrying the solution, a rubber or similar stopper or closure closing the container, and conduit means leading from the container to the patient. In administration the container is suspended in inverted position. An air-bleed is provided ordinarily, consisting of a rubber tubing terminating in a needle at one extremity which pierces the container stopper, and terminating in an air filter at its other end. To provide the solution conduit to the patient a second rubber tubing is used, terminating at one extremity in a needle used to pierce the container stopper and at its other extremity in a needle inserted directly into the patient. A simple clamp is provided for the tubing, for the purpose of controlling flow of the solution. A glass tube forms a part of the tubing, that the solution may be viewed as it flows into the patient; and particularly material to the instant invention, a filter has always heretofore been provided interposed in the tubing for the purpose of filtering out any foreign and possibly harmful solids and the like which might accidentally be present in the solution.

Heretofore the aforesaid filter has usually consisted of a glass tube filled with suitable filtering material, the tubing itself being cut and the glass tube being interposed in the said tubing. When administration is to take place it is absolutely necessary to provide such filtering means, but the fact that the means is separate from the apparatus proper and must be incorporated therein is a source of much inconvenience and, indeed, has been occasionally inadvertently left out, with sometimes harmful and even fatal consequences to the patient.

An attempt has previously been made to provide a filtering means directly built into the intravenous solution-dispensing apparatus itself, but such attempt has failed of practical significance inasmuch as the means used has presented the likelihood of introducing air into the vein of the patient.

It is, therefore, the purpose of this invention to do away with the necessity of providing a filtering means of the kind which must be incorporated in the intravenous solution-dispensing apparatus as a separate operative step for administration purposes.

It is a further object of this invention to provide a filtering means directly built into the intravenous solution-dispensing apparatus itself, such means requiring no attention by the operator and being, in fact, supplied as an integral part of the container assembly which contains the intravenous solution.

It is a further object of this invention to provide such a built-in filtering means as will obviate any danger that air might be introduced into the vein of the patient.

It is yet another object of the invention to provide in several embodiments a type of built-in filter, the operation of which is not dependent upon any attention whatsoever at administration.

And it is the over-all object of the invention to contribute additional safety and security to the art of administering intravenous solutions, such safety and security being of basic importance to said art.

Further objects of the invention will appear hereinafter.

Figures 1, 2, 3, 4:
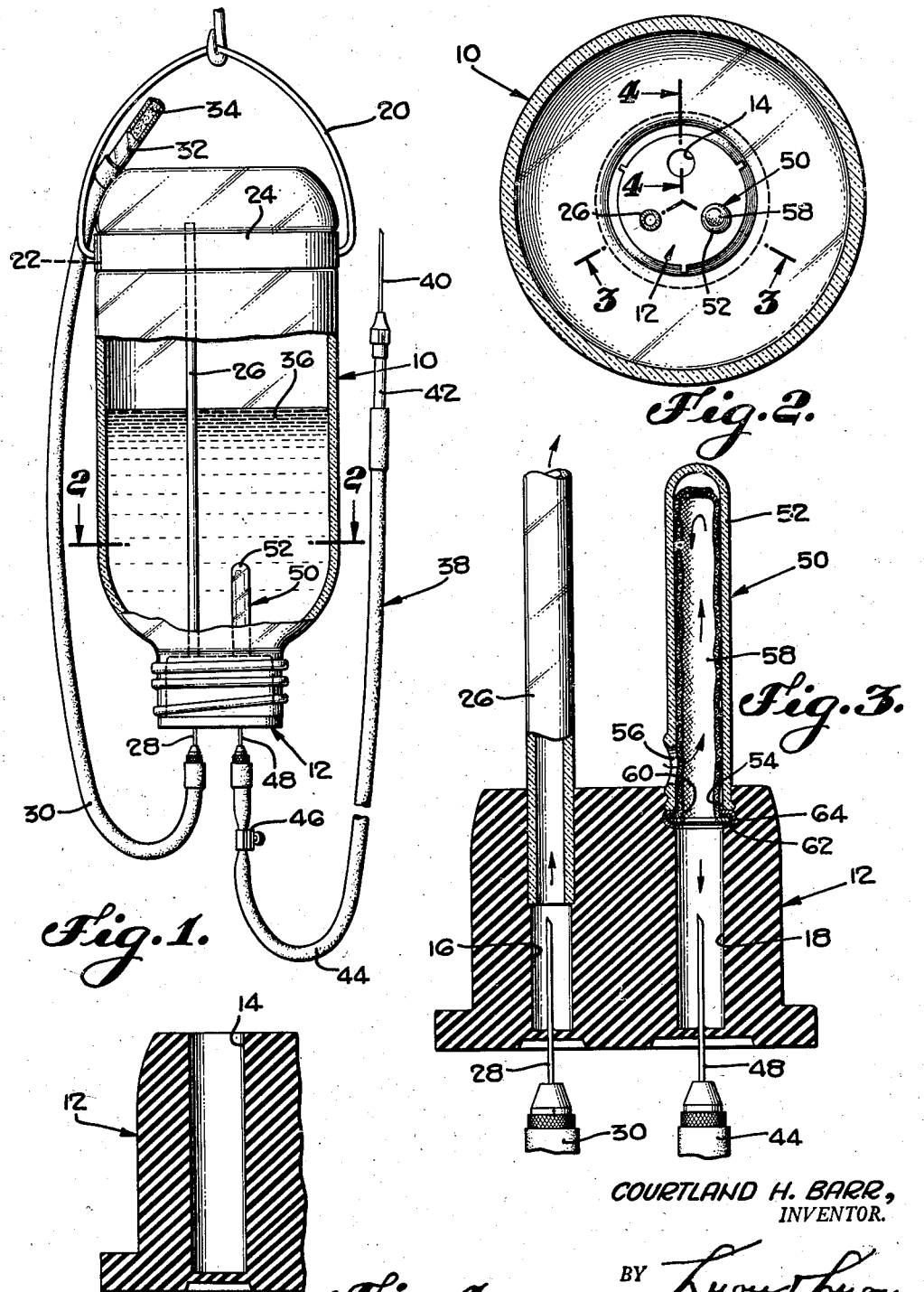
Figure 1 shows an intravenous solution container and associated apparatus in position for dispensing the solution to the patient.
Figure 2 shows a cross-sectional view of such container, taken on the line 2—2 of Figure 1.
Figure 3 shows a partial sectional view of the apparatus, taken on the line 3—3 of Figure 2.
Figure 4 shows a partial sectional view of the apparatus taken on the line 4—4 of Figure 2.
Figure 5:
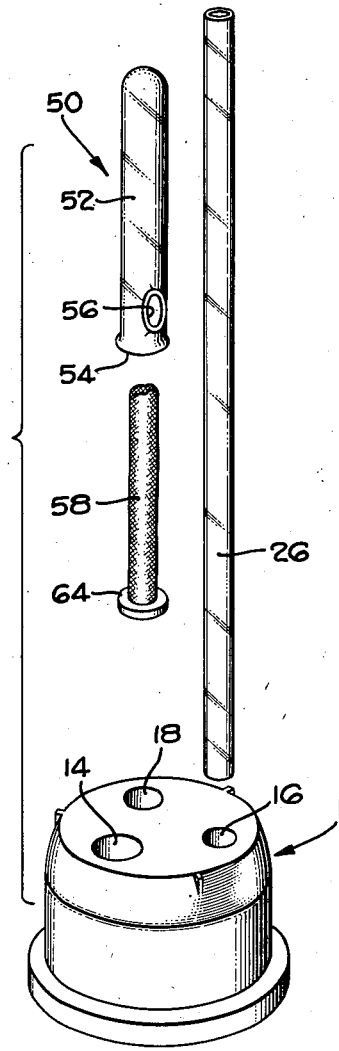
Figure 5 shows an exploded view of the elements of the apparatus.

Referring to the drawings, the material which is to be intravenously introduced into the patient is originally delivered in a container 10 as a liquid or, as in the case of dried plasma, in a desiccated form. The container is airtight, is provided with a stopper 12, and the stopper is originally covered with a removable metal cover, not here shown. The stopper 12 ordinarily has three bores or outlets, the bore 14 for the purpose of introducing into the solution or to the dried plasma desired additives and the like, the bore 16 for the purpose of the air-bleed, and the bore 18 for the purpose of administration. It will be noted that such bores do not completely pierce the said stopper 12, but are, rather, terminated short of such piercing so that the interior of the container might be preserved sterile. Although not shown here, it will be seen that access to the bore 14 is readily obtained by the use of a needle, so that the aforesaid additive materials may be added to the substance within the container.

In Figure 1 the container is shown in administration position, entrance through the bore 14 having already been made. A bail 20 has been provided for the container, said bail supporting the container by means of an annular groove 22 and annular strap 24 so that the entire assembly may be suspended in inverted position, as shown. So that the solution may readily flow, the bore 16 is fitted with a glass tube 26 press-fitted therein and communicating with a needle 28 leading to a rubber tube 30 and an open glass tube 32 containing an air-filtering material 34, the glass tube 26 being of such length as to project above the level of the intravenous solution 36. It will be noted that the needle 28 easily pierces the portion of the stopper 12 blocking access to the bore 16.

The administration conduit 38 consists of the administration needle 40 which is inserted into the patient, the glass observation tube 42, rubber tubing 44, control clamp 46 and needle 48, the said needle 48 being a duplicate of the needle 28 and being inserted into the bore 18.

The aforedescribed apparatus is all standard apparatus and old in the art but heretofore it has been necessary to provide for administration some kind of filter in the rubber tube 44 that would serve to prevent the introduction into the patient of foreign materials which might prove dangerous to the patient, and it is with a means for avoiding this expedient that the instant invention is concerned. The instant invention contemplates the provision of a filtering means 50, built into the container apparatus itself in its original construction. In the preferred embodiment it consists of a glass tubing cap 52, open at one end 54, and having an orifice 56 adjacent such opening 54. An elongated filtering element 58 is provided within the tubing cap 52 which may itself have an opening 60, such filtering element being preferably composed of fine wire mesh and, as shown in Figure 3, it may be provided with a metal washer 62, and an annular member 64 which serves as an abutment against the glass tubing cap 52 when the filtering element is inserted therein. As with the air-bleed tube 26, the aforesaid filtering means 50 is press-fitted into the bore 18 of the stopper 12.

In the operation of the foregoing apparatus it will be seen that after insertion of the needle 40 into the patient and loosening of the clamp 46, solution freely flows through the orifice 56 of the glass tubing cap 52 through the filtering element 58 into the needle 48, and hence to the patient. Provision of the orifice 56 adjacent the end 54 of the tubing cap 52 assures that as the container is exhausted of solution air will not be passed into the patient.

As aforesaid, the instant invention does away completely with the problem of providing a separate filter interposed in the conduit from the container to the patient. It is built into the container apparatus in the first instance and is an integral part of the same from the moment that the intravenous material is stored in the said container and the container sealed prior to shipment to the place of administration.

Figure 6:
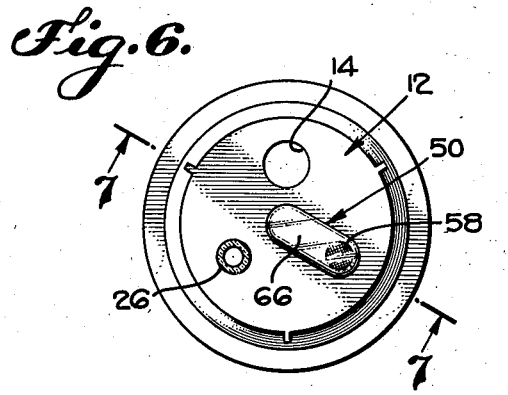
Figure 6 shows a top plan view of a stopper and associated elements comprising a modified form of the invention.
Figure 7:
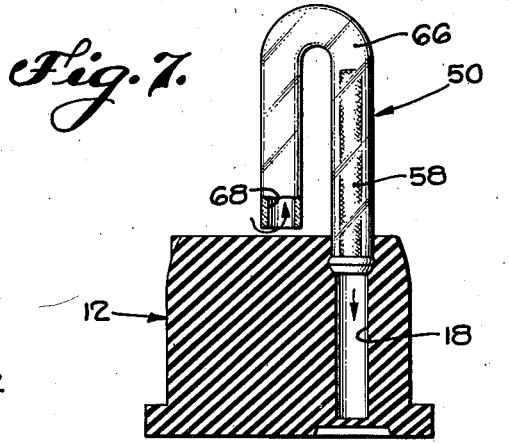
Figure 7 shows a sectional view of the apparatus of Figure 6 taken on the line 7—7 of Figure 6.

Referring now to Figures 6 and 7, a modification of the invention is shown. Such modification comprises providing the glass tubing cap 52 of Figure 3 as an open-ended U-shaped tubing cap 66 having the filtering element 58 extending into one of its branches, such tubing being in all respects the same as the tube 50 except that instead of providing the orifice 56, ingress to the filtering element 58 is accomplished through the open end or orifice 68 of the said U-shaped tubing cap.

Figure 9:
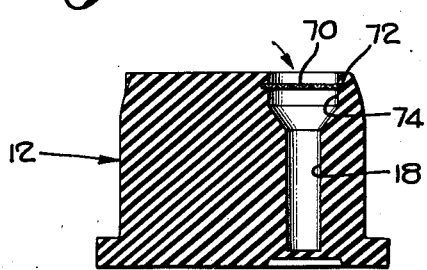
Figure 9 shows a sectional view taken along the line 9—9 of Figure 8.
Figure 8:
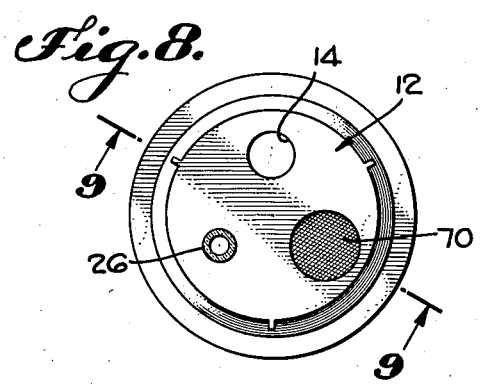
Figure 8 shows a view similar to that of Figure 6 of another modification of the invention.

Lastly, Figures 8 and 9 show a second modification. Such modification consists in doing away entirely with the glass tubing members 52 and 66 and providing instead a filtering element in the form of a disc 70, preferably of fine wire mesh. Such disc 70 is incorporated directly in the bore 18, as shown in Figure 9, preferably by means of an annular groove 72 cut in the said bore. If preferred, the bore 18 may be enlarged by a counterbore 74, as shown in Figure 9. In the practice of this modification of the invention care must be exercised that the needle 48 not pierce the screen lest the filtering effect be lost.

While there have been described what are at present considered preferred embodiments of the present invention, it will be apparent to those skilled in the art that various modifications and changes may be made without departing from the essence of the invention, and it is intended to cover herein all such modifications and changes as come within the true scope and spirit of the appended claims.

I claim:

1. In a device of the class described: a stopper, said stopper being provided with a bore; and a filter across said bore, said filter including an elongated filtering element and a tubing cap therefor, said filtering element and said cap being inserted into said bore of said stopper and being carried thereby, said tubing cap being orificed adjacent said stopper for the admission of solution through said orifice into said cap and through said bore and said tubing cap being closed except at said orifice to exclude solution or other fluid from passage into said cap and through said bore except through said orifice.

2. Intravenous solution dispensing apparatus comprising: a container; a stopper for said container, said stopper being provided with a bore; and a filter in said container across said bore, said filter including an elongated filtering element and a tubing cap therefor, said filtering element and said cap being inserted into said bore of said stopper and being carried thereby, said tubing cap being orificed adjacent said stopper to admit solution into said cap, and said tubing cap being closed inwardly of said stopper and orifice to exclude solution from said cap except through said orifice, whereby upon the inverting of said container to dispense solution therefrom air may not pass into said cap and through said bore.

3. In a device of the class described: an elongated filtering element; and a tubular cap therefor, one end of said cap being open and said cap having an orifice adjacent said end, the remainder of said cap extending from said orifice being closed.

4. In a device of the class described: a stopper, said stopper being provided with a bore; and a filter across said bore, said filter including an elongated filtering element and a tubular cap therefor, one end of said cap being open and inserted into said bore, said cap having an orifice adjacent said end for the admission of solution through said orifice into said cap and through said bore, and said cap being closed except at said orifice to exclude solution or other fluid from passage into said cap and through said bore except through said orifice.

5. Intravenous solution dispensing apparatus comprising: a container; a stopper for said container, said stopper being provided with a bore; and a filter within said container across said bore, said filter including an elongated filtering element and a tubular cap therefor, one end of said cap being open and inserted into said bore, said cap having an orifice adjacent said end to admit solution into said cap, and said cap being closed inwardly of said stopper and orifice to exclude solution from said cap except through said orifice, whereby upon the inverting of said container to dispense solution therefrom air may not pass into said cap and through said bore.

6. Intravenous solution dispensing apparatus comprising: a container; a closure therefor; an outlet through said closure; and a filter within said container and across said outlet, said filter including an elongated filtering element and a tubing cap therefor, said filter element and said cap being carried by said closure, and said tubing cap being orificed adjacent said closure to admit solution into said cap, and said tubing cap being closed inwardly of said closure and orifice to exclude solution from said cap except through said orifice, whereby upon the inverting of said container to dispense solution therefrom air may not pass into said cap and through said outlet.

7. An intravenous solution-dispensing apparatus comprising: a container; a closure therefor; an outlet through said closure; and a filter within said container and across said outlet, said filter including an elongated filtering element and an open-ended U-shaped tubing cap therefor, said filtering element and said cap being carried by said closure by one branch of said cap, the open end at the other branch of said cap providing an orifice adjacent said closure to admit solution into said cap, and said tubing cap being closed inwardly of said closure and orifice to exclude solution from said cap except through said orifice, whereby upon the inverting of said container to dispense solution therefrom air may not pass into said cap and through said outlet.

8. In a device of the class described: a stopper, said stopper being provided with a bore; and a filter across said bore, said filter including an elongated filtering element and an open-ended U-shaped tubing cap therefor, said filtering element extending into one branch of said U-shaped tubing cap, said branch of said cap being inserted into said bore, the open end at the other branch of said cap providing an orifice adjacent said stopper for the admission of solution through said orifice into said cap and through said bore and said tubing cap being closed except at said orifice to exclude solution or other fluid from passage into said cap and through said bore except through said orifice.

COURTLAND H. BARR.

REFERENCES CITED

The following references are of record in the file of this patent:

UNITED STATES PATENTS

| Number | Name | Date |
| --- | --- | --- |
| 2,464,496 | Gee | Mar. 15, 1949 |
| 2,470,943 | Page | May 24, 1949 |